United States Patent [19]

Collin

[11] 4,141,241
[45] Feb. 27, 1979

[54] ANALYZING EXHAUST GASES FROM AN INTERNAL COMBUSTION ENGINE

[75] Inventor: Lars T. Collin, Mölndal, Sweden

[73] Assignee: Collin Consult AB, Mölndal, Sweden

[21] Appl. No.: 865,488

[22] Filed: Dec. 29, 1977

[30] Foreign Application Priority Data

Jan. 13, 1977 [SE] Sweden ............................... 7700285

[51] Int. Cl.² ........................................... G01M 15/00
[52] U.S. Cl. ....................................... 73/117.3; 73/23
[58] Field of Search ......................... 73/116, 117.3, 23

[56] References Cited

U.S. PATENT DOCUMENTS

| | | | |
|---|---|---|---|
| 3,757,571 | 9/1973 | Chamberas | 73/116 |
| 3,999,425 | 12/1976 | Collin | 73/116 |
| 4,064,747 | 12/1977 | Rackliffe et al. | 73/116 |

Primary Examiner—Jerry W. Myracle
Attorney, Agent, or Firm—Cantor and Singer

[57] ABSTRACT

Exhaust gas is sampled from an internal combustion engine operated disconnected from the transmission elements, thus braked by its inertia and internal losses only.

Before running the test it is important to find out the positions, at which the fuel supply means ensures idle running and maximum fuel supply, respectively. A monitoring device is designed to find out these positions, and then to run a test cycle between those positions. The monitoring device may include means for running, prior to the actual test, a short conditioning program at the engine, to ensure that the same has attained a desired normal temperature, when the test starts.

17 Claims, 2 Drawing Figures

ANALYZING EXHAUST GASES FROM AN INTERNAL COMBUSTION ENGINE

BACKGROUND OF THE INVENTION

For analyzing the exhaust gases of an internal combustion engine the present inventor, in U.S. Pat. No. 3,999,425, has proposed a device, which includes a mechanical unit actuating the fuel supply means of the engine, as well as means for branching-off a portion of the total volume of exhaust gas, and conveying this branched-off portion to an analyzing apparatus, or to a container suitable for transporting gas to the analyzing apparatus. The engine is disconnected from the power transfer means and is permitted to run at idling speed, and it is presupposed that the mechanical actuating unit is governed by a monitoring device, which is programmed to cause, during a pre-determined period of time a number of variations in the fuel supply to the engine, to simulate various driving conditions. As the internal losses and the inertia of the engine are the only load imposed upon the engine the testing sequence will be determined by the relationship between speed, momentary acceleration or retardation against inertia and internal losses, as well as equilibrium conditions at constant speed in pre-determined proportions and sequences.

It is evident that equipment which must be used for analyzing the exhaust gases from engines of different types, must be adjustable to suit the characteristics of different engines. Even engines within the same series, and having the same nominal output may differ after some time of use. It is therefore advantageous that the device includes means making it possible, in a simple manner, rapidly to adjust the same to the condition of an actual engine, the exhaust gases of which are to be analyzed.

SUMMARY OF THE INVENTION

According to a method of the invention the monitoring device transferring the test program to the fuel supply means is adjusted with respect to the rated power of the actual engine and the weight of the vehicle in which it is mounted in such a manner, that acceleration changes in the engine are governed in such a manner, that they substantially will correspond to changes in speed of the vehicle, presupposed by the program.

A device according to the invention is characterized in a first means adapted to sense ignitions at one cylinder of the engine and to transform those ignitions into governing impulses, a second means operable by said pulses and adapted to adjust said mechanical means for idle running of the actual engine, and a third means, likewise operable by said pulses and adapted to adjust the monitoring unit for a position at the fuel supply control means corresponding to a condition, where the acceleration of the engine ceases.

The engine may have been run hard just before the test is to be made, but it may also happen that a very cold engine is received for testing. It is therefore advantageous to provide the monitoring unit, beside the means for adjustments corresponding to engine power, the weight of the vehicle, and the selected test cycle, with further means for performing, prior to the actual test program, a run-in period ensuring a pre-determined operational temperture of the engine, as well as of the exhaust conduitry, including possible thermal or chemical reactors. The device may further include a fourth means for pre-setting estimated values of idle running and fuel supply means position corresponding to fully open throttle at the engine to be tested.

The first means preferably includes a timing unit adapted to maintain in open position, during a pre-determined period of time, a valve communicating the exhaust pipe of the engine and a receiver for the gas to be analysed, said first means further being adapted to sense and to record the number of ignitions during the test period.

DESCRIPTION OF A PREFERRED EMBODIMENT

Figure 1:
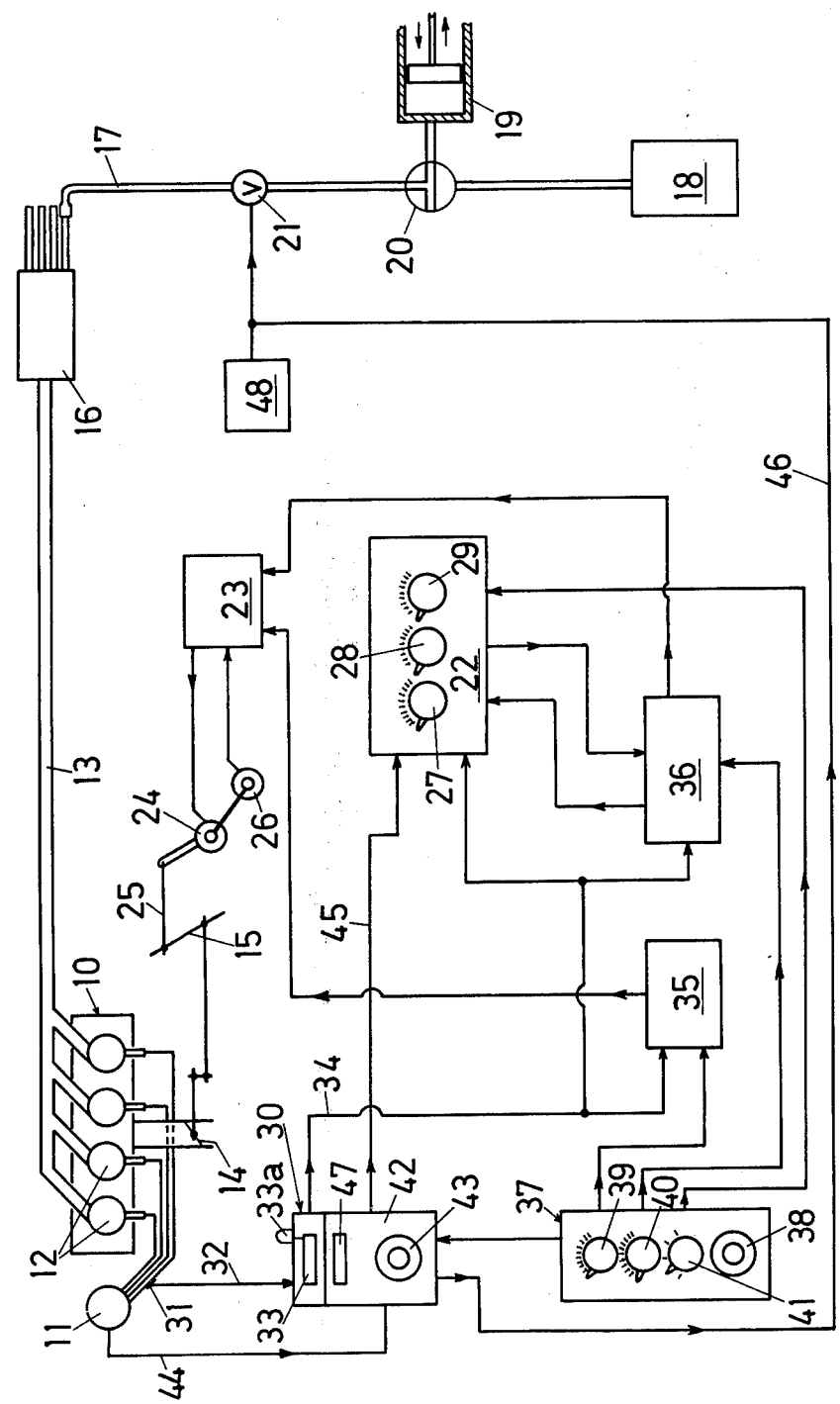
FIG. 1 schematically shows a device for sampling and handling exhaust gases from a vehicle internal combustion engine.

FIG. 1 is, as mentioned above, schematic in order to illustrate the function and the interrelationship. No current supplies to the units are included, nor are the electronic components thereof shown. A man skilled in the art knows how such problems are solved, and the main thing, when the invention is considered, is how the units cooperate.

A four cylinder internal combustion engine of the Otto-type is denoted by 10. The engine is provided with a distributor 11, a spark plug 12 at each cylinder, and an exhaust pipe 13.

The throttle valve is denoted by 14, and the gas pedal of the vehicle is denoted by 15.

When an exhaust gas test is to be run a gas proportioning device 16 is attached to exhaust gas pipe 13. This device subdivides the exhaust gas flow in a number of equal part-flows, and one of those is, by way of a conduit 17, transferred to a gas analysing device 18, either directly, or after storage in the intermediate container 19. The flow of gas is governed by a three-way valve 20, which may be set manually or by automatic means. Container 19 is adapted to receive, and, later on, to release the gas received. It is here, as an example, illustrated as a cylinder, in which a piston is movable. A sampling valve 21 is fitted in conduit 17, upstream of three-way valve 20, and will be maintained in open position during the test run.

During the testing sequence the gas pedal 15 of the engine shall be made to perform certain movements — resulting in variations in the fuel supply — being governed by a monitoring device 22. This issues signals to a servo-amplifier 23, which governs an electric disc motor 24. This actuates the gas pedal by way of some suitable transfer means 25. The disc motor is expected to move the gas pedal forwards and backwards at a speed of 1 m/sec. The transfer means must have sufficient reach to be able to move the gas pedal to its bottom position, and the arrangement, in general, is adapted to impose a load of about 300 N. An actual-value potentiometer 26 is mounted upon the shaft of the disc motor, the potentiometer back-feeding signals to servo-amplifier 23.

In order to accomodate monitoring unit 22 for use with engines of different type, mounted in vehicles of different weight, adjusting means 27 and 28 are provided for engine power and vehicle weight, respectively. The monitor unit, further, is provided with means 29 making it possible to select any of a number of test cycles. Future development is expected to include providing each individual, or at least each type of vehicle, with an information carrier, upon which all relevant data are noted, for instance as a card, insertable into the monitoring unit and readable thereby. In such manner a manual adjustment of the unit to correspond with the individual vehicle may be avoided.

Figure 2:
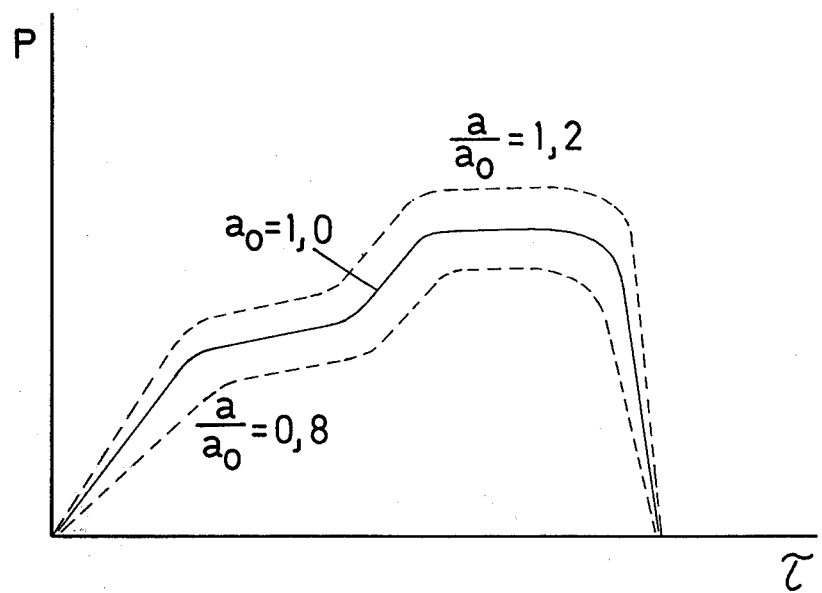
FIG. 2 is a diagram illustrating how to adjust a portion of a test cycle program, to take variations in the relationship between engine power and vehicle weight into account.

FIG. 2 is a diagram illustrating changes in the position of the fuel supply means P, as a function of time T, during a portion of a test cycle. It is presupposed that the cycle includes a number of such portions, having various shape and magnitude, separated by moments of idling.

The acceleration a, which is determined by the position of the fuel supply means, is a function of the weight G of the vehicle, and the engine power Ne according to $a = (G/Ne)$.

The full-line curve shows a normal value, where $a_O = 1.0$. The upper broken line shows how it is necessary to adjust the position of the fuel supply means, when the relationship between vehicle weight and engine power make it necessary to provide a value of the acceleration, a, being related to the normal value as $(a/a_O) = 1.2$.

The lower broken line shows the necessary adjustment of the fuel supply means at $(a/a_O) = 0.8$.

Different test cycles have been established in various countries, a rule the ways in which the engines are to be run, when the exhaust gas is to be analyzed. The form of these test cycles is, i.e., determined by the traffic situation in the country in question, and it is presupposed that the engine is mounted upon a chassis dynamometer, and is run according to a pre-determined program.

By using the inertia and the internal losses of an idling engine as a load during sequences of acceleration and retardation it is possible to run a test during a much shorter time, about half a minute, but it is evident of interest to obtain results, which are comparable with those of established test cycles. It is therefore desirable, that the monitoring device is easily adjustable to simulate any one established test cycle.

In order to provide uniform and definite operation conditions at an engine to be tested it is essential to establish the idling speed of the engine, as well as load variations characteristic for the individual vehicle. To that end, the device includes three means, cooperating with the monitoring unit 22.

A first means 30 is adapted to sense the ignitions at one engine cylinder and to transform them into governing signals. With an Otto-engine the sensing may in a simple manner be performed by fitting an induction clamp 31 upon the cable connected to the spark plug of one cylinder, preferably cylinder No 1, and to connect the clamps with means 30, by way of a conductor 32. The idling speed will be displayed in a window 33.

A connection is also made with the distributor in order to sense all ignitions. This means will issue signals indicating the idling speed, the integrated speed during the test cycle, and it is furthermore connected to a protecting device, which short-circuits the distributor to ground, if the engine should tend to over-speed.

Out-signals from the first means 30 are, by way of a conductor 34, transferred to a second means 35, which will automatically cause an idle speed adjustment, and to a third means 36, which senses the position of the fuel supply means, when the throttle is fully open. Conductor 34 futhermore transfers the ignition signals to monitoring device 22. There are two possible errors at the fuel supply means to be considered, also when running tests upon a number of vehicles of basically the same type. The first error may be found in the zero-point adjustment, i.e., the depression of the gas pedal necessary to provide a power increment above what is needed for idling. In order to eliminate the distribution of errors of this type, the gas pedal is depressed slowly, and the position, at which an increase above the idling speed is attained is recorded.

The second means, 35, is adpated to compare, during idling, the time between two consecutive ignitions with a pre-selected time. If the time between two ignitions is too long, i.e., the idling speed is too low, means 35 will initiate a ramp generator having a memory.

The gas pedal of the engine to be tested will be slowly depressed by motor 24 by way of the transfer means 25, until the speed of the engine will correspond with the pre-selected speed. Means 35 will then automatically be switched off, but the position of the gas pedal is recorded in the memory. In this manner the idling speed of the engine will automatically be adjusted to, or slightly to exceed the recommended nominal idling speed for the engine in question.

Should the idling speed prove to be exceptionally high a conventional adjustment towards a normal speed must be performed. The first means, 30, may be provided with a warning device 30a, for instance a lamp, which is switched on if the number of revolutions indicated in window 33 exceeds nominal, or desired, idling speed.

The pressure in the inlet manifold of the engine is rather low during idle running, when throttle 14 is almost closed and critical speed is at hand. A noticeable increase in the pressure will be noted initially, as the throttle begins to open, but the increase will be less when the throttle approaches its fully open position. The increase in pressure, thus, does not follow the throttle position linearly.

The pressure in the inlet manifold will determine the degree of charge to the cylinders, and thus also the acceleration. When the throttle is fully open, no further increase of the pressure is obtainable, and thus no further increase of the acceleration occurs. It is important to establish the position of the fuel supply means, when this occurs, which corresponds to the maximum fuel supply, as defined here.

Means 36 operates about in the same manner as means 35. The frequency of the signals transmitted from means 30 are transformed into a voltage, which is proportional to the number of revolutions. This voltage is derivated twice in an electronic circuit, to produce the second derivative of the speed, which is characteristic for the increase in acceleration. When the acceleration ceases to increase there is a sudden jump in the second derivative, when the curve switches from plus to minus.

Means 36 includes a bi-stable flip-flop adapted to operate a ramp generator, which produces an increasing voltage. This is applied to the servo-amplifier 23, which, as above mentioned, will actuate gas pedal, 15. This is depressed until the increase of acceleration ceases. At that point the derivation circuit reacts with the jump, above mentioned, switching over the flip-flop, so the ramp generator is stopped. The actual value of the voltage at that point is stored in the memory. The positions occupied by the gas pedal, during idling and ceasing accelerations, respectively, are thus defined, and the monitoring unit 22, may, by way of amplifier 23 actuate the gas pedal, between those values, in response to the test cycle selected.

The device includes a fourth means 37, which, in the embodiment shown, includes a starting press-button 38 for activating the device. This fourth means further includes two rotatable knobs 39 and 40, for presetting estimated idling speed and for indicating a maximum speed. which must not be exceeded during the test. Signals from electronic devices manipulated by said knobs are transferred to means 35 and to an over-speed protector.

The fourth means 37 also includes a knob 41 for actuating means ensuring a temperature conditioning of the engine. A vehicle received for exhaust gas analysis may have been driven hard just before the test, and the engine will then have a temperature exceeding that, at which a test is normally performed. On the other hand it may happen, that the engine is too cool, or that the ambient temperature is extraordinarily low. On such occasion the engine temperature, as well as that of the exhaust pipe, must be raised, so condensation in the exhaust pipe is avoided.

It will thus be advantageous to be able to run the engine a short while, so it can attain a suitable temperature. By way of knob 41 it is possible to actuate the monitoring unit, so it either reduces or raises the engine temperature to a value, considered normal when running a test.

The means performing the various functions above described may of course be physically located and arranged otherwise than shown in the drawing.

A time unit 42 is connected to first means 30 and is provided with a starting button 43. The timing unit is connected to distributor 11 of the engine, by way of a conductor 44, and also, by way of an output conductor 45, to the monitoring unit, 22, as well as to sampling valve 21 by way of a second output conductor 46. The test sequence will either be switched on automatically, when the conditioning sequence is terminated, or by pressing button 43.

The sequence starts with a delay of a few seconds, so the exhaust pipe will be filled with exhaust gases from idle running, whereupon the device awaits an ignition being sensed at clamp 31. This causes a signal by way of connector 45 to the monitoring device 22, to start the cycle program, and also a signal, by way of conductor 46 to sampling valve 21. This is maintained in open position for a period of time corresponding to that necessary to run the full program. usually thirty seconds, a few of the last seconds ensuring idle running.

The first means 30 also includes a counter, recording the total number of ignitions during the test cycle. This number is shown in window 47. The test cycle means that a given quantity of fuel is administered to the engine, and should cause a certain number of ignitions at the engine. The recorded, actual number of ignitions will, when compared with the theoretically determined value, provide an indication of the efficiency of the engine.

A diesel engine, will not have any electric ignition system, so instead of an induction clamp 31, it will be necessary to attach some other sensing device to the fuel conduit between the injection pump and cylinder No 1. Instead of connector 44 from distributor 11 it is possible to use a counter, which multiplies the number of injection pulses at one cylinder with the number of cylinders, or to attach some sensing means to a rotating component in the engine, for instance the fly-wheel.

When a device of this type is leased to workshops and control institutions, a counter 48 is included, for instance to connector 46, to record how many times the device has been used, i.e., how may analyzing tests have been performed.

What I claim is:

1. A method of obtaining representatively comparable results, when analyzing exhaust gases from different vehicle internal combustion engines, comprising varying the engine fuel supply means according to a preselected test program to simulate varying operating conditions, in which a monitoring device, transferring the test program to the fuel supply means of the engine, is adjusted with respect to the rated power of the actual engine and the weight of the vehicle in which it is mounted in such a manner, that acceleration changes in the engine are governed so they substantially correspond with changes in speed of the vehicle, presupposed by the program.

2. The method according to claim 1, in which the position of the fuel supply means corresponding to idling of the engine, as well as the position of said means corresponding to maximum fuel supply, are sensed and recorded, before each testing operation, and the test program is performed within the limits set by those recorded positions.

3. The method according to claim 2, in which the maximum fuel supply is recorded as the position reached by said means, when the acceleration, during a continuously increasing change at said means, ceases to increase.

4. The method according to claim 2 in which a conditioning program for the engine and the exhaust system is performed before or after recording the position occupied by the fuel control means during idling and at maximum fuel supply, respectively.

5. The method according to claim 2 in which a conditioning program for the engine and the exhaust system is performed before and after recording the position occupied by the fuel control means during idling and at maximum fuel supply, respectively.

6. The method according to claim 1, in which the position of the crank shaft of the engine is monitored and the test program is started at a predetermined angular position of said shaft.

7. The method according to claim 6, as used in connection with an Otto-engine, in which the position of its crank shaft is monitored by sensing the pulses in the ignition system.

8. The method according to claim 6, as used with a Diesel-engine, in which the position of its crank shaft is monitored by sensing pulses in the fuel injection system.

9. The method according to claim 1, in which the number of engine revolutions is counted during at least part of the test program as a basis for establishing the efficiency of the engine.

10. The method according to claim 1, in which a valve, communicating the exhaust pipe of the engine with a collector means of the analysing apparatus, is maintained in open position during the time only, when the test program is performed, and simultaneously the number of engine revolutions is recorded.

11. A device for obtaining representatively comparable results, when analysing exhaust gases from different vehicle internal combustion engines by varying the engine fuel supply means according to a preselected test program to simulate varying operating conditions, comprising a monitoring unit for imposing said test program upon the engine, mechanical means for varying the engine fuel supply means, a first means adapted to sense ignitions at one cylinder of the engine and to transform those ignitions into governing impulses, a second means operable by said pulses and adapted to adjust said mechanical means for idle running of the actual engine, and a third means, likewise operable by said pulses and adapted to adjust the monitoring unit for a position at the fuel supply control means corresponding to a condition, where the acceleration of the engine ceases.

12. The device according to claim 11, in which the monitoring unit, above means for adaptation with respect to engine power, vehicle weight and actual test program, furthermore includes means for running, prior to the actual test program, a temperature conditioning program.

13. The device according to claim 11, further including a fourth means, including elements for pre-setting estimated values of idle running, and maximum fuel supply, respectively, for the engine to be tested.

14. The device according to claim 13, in which the fourth means includes an element for governing the temperature conditioning.

15. The device according to claim 11, in which the first means includes a timing unit adapted to maintain in open position, during a pre-determined period of time, a valve communicating the exhaust pipe of the engine and a receiver for the gas to be analyzed.

16. The device according to claim 11, in which the first means further is adapted to sense and to record the number of ignitions during the test period.

17. The device according to claim 11, further including a safety device adapted to short-circuit the electric supply system to ground in case the engine speed rises above a predetermined upper value.

* * * * *